N. H. Lindley,
Hand Plow,
№ 86,846.            Patented Feb. 9, 1869.

Witnesses,
John H. Shumway
A. J. Tibbits

Inventor.
N. H. Lindley
By John E. Earle
his Attorney

N. H. LINDLEY, OF BRIDGEPORT, CONNECTICUT.

Letters Patent No. 86,846, dated February 9, 1869.

IMPROVEMENT IN HORSE-HOE.

The Schedule referred to in these Letters Patent and making part of the same.

*To all whom it may concern:*

Be it known that I, N. H. LINDLEY, of Bridgeport, in the county of Fairfield, and State of Connecticut, have invented a new Improvement in Horse-Hoe; and I do hereby declare the following, when taken in connection with the accompanying drawings, and the letters of reference marked thereon, to be a full, clear, and exact description of the same, and which said drawings constitute part of this specification, and represent, in—

Figure 1:
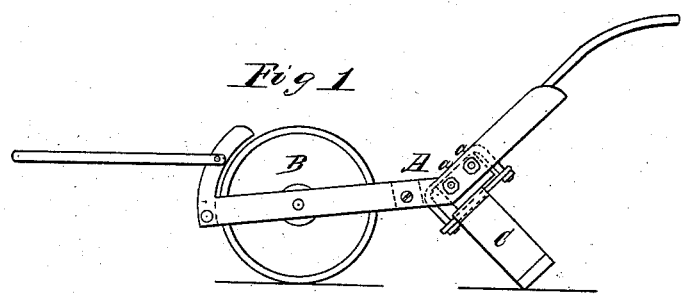
Figure 2:
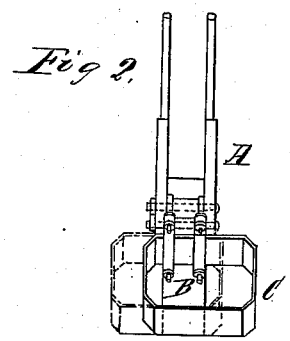
Figure 3:
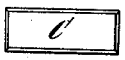

Figure 1, a side view,
Figure 2, a rear view, and in
Figure 3, a section of the hoe detached.

This invention relates to an improvement in the agricultural implement commonly called a horse-hoe; that is, an implement which may be drawn along the hills or rows to be cultivated, for the purpose of lightening the soil, the object being to produce a hoe which may be adjusted to the right, left, or centre, and which, at the same time, may be adjusted to present a new edge, when the new edge in use shall have become dull. To this end, The invention consists in forming the hoe of four nearly equal sides, and each of the sides sharpened upon its opposite edge, so that the four sides, combined, produce eight edges, and when one edge has become dull, a new edge may be presented, until the whole eight have been used, and the said hoe attached to the frame, so that it may be set to any position from right to left.

To enable others to fully understand my improvement, I will proceed to describe the same, as illustrated in the accompanying drawings.

A is the frame, supported upon the wheel B in the usual manner for this class of implements.

C is the hoe, which is here represented as made of thin metal, of four equal sides, the opposite edges of each side being ground off, or sharpened, as seen in fig. 3.

The hoe thus formed is attached, by one of its sides, to the frame, as seen in figs. 1 and 2, and so that it may be adjusted to the right or left, or to any point between, as denoted in figs. 1 and 2, and also to different inclinations, by the bolts *a*.

When, from use, the edge, acting directly, has become dulled, the hoe is loosened from its attachment to the frame, and turned, to present a new edge, then adjusted and secured as before, and so on until the whole eight edges have been dulled or worn out.

This form, which gives such an extent of adjustment, at the same time produces a stronger instrument, and greatly improved in its utility.

Having fully described my invention,

What I claim as new and useful, and desire to secure by Letters Patent, is—

The hoe C, constructed and made adjustable upon its frame, substantially in the manner herein set forth.

N. H. LINDLEY.

Witnesses:
G. B. WALLER,
C. M. MINOR.